United States Patent
Clifford

(10) Patent No.: US 10,995,772 B2
(45) Date of Patent: May 4, 2021

(54) AGRICULTURAL HARVESTER COOLER BOX WITH DEBRIS GUARD

(71) Applicant: CNH Industrial America LLC, New Holland, PA (US)

(72) Inventor: Jimmie D. Clifford, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 111 days.

(21) Appl. No.: 16/360,522

(22) Filed: Mar. 21, 2019

(65) Prior Publication Data

US 2020/0300270 A1     Sep. 24, 2020

(51) Int. Cl.
| | |
|---|---|
| *A01D 75/00* | (2006.01) |
| *F04D 29/70* | (2006.01) |
| *F04D 19/00* | (2006.01) |

(52) U.S. Cl.
CPC ........... *F04D 29/703* (2013.01); *A01D 75/00* (2013.01); *F04D 19/002* (2013.01)

(58) Field of Classification Search
CPC ...... A01D 75/00; F04D 29/703; F04D 19/002
See application file for complete search history.

(56) References Cited

U.S. PATENT DOCUMENTS

| | | | | |
|---|---|---|---|---|
| 4,542,785 A | * | 9/1985 | Bagnall ................... | F01P 11/12 165/95 |
| 5,427,502 A | * | 6/1995 | Hudson .................... | F01P 5/06 123/41.49 |
| 5,466,189 A | * | 11/1995 | Deutsch ................... | F01P 11/12 460/100 |
| 7,507,270 B2 | * | 3/2009 | Maas ..................... | F02M 35/022 55/385.3 |
| 7,875,093 B1 | * | 1/2011 | Hershbarger ...... | B01D 46/0056 55/344 |
| 7,946,367 B2 | * | 5/2011 | Good ................. | B01D 46/0056 180/68.1 |
| 7,997,238 B2 | * | 8/2011 | D'hondt ................... | F01P 11/12 123/41.31 |
| 2008/0178825 A1 | * | 7/2008 | Mitchell ................... | F01P 1/06 123/41.56 |
| 2010/0006361 A1 | * | 1/2010 | Vandike ................... | F01P 11/12 180/68.1 |

(Continued)

FOREIGN PATENT DOCUMENTS

| | | | |
|---|---|---|---|
| CN | 204498778 U | 7/2011 | |
| EP | 1950074 A1 * | 7/2008 | ............. A01D 41/12 |
| EP | 1950074 | 7/2009 | |

*Primary Examiner* — Erez Gurari
(74) *Attorney, Agent, or Firm* — Peter Zacharias; Patrick Sheldrake

(57) ABSTRACT

A cooler box for an agricultural harvester includes: a frame including an opening; a screen held in the opening and including a plurality of screen apertures defining a screen aperture size; a cooling fan configured to produce an airstream that flows through a front of the screen; a wand assembly including a wand associated with the screen and a blower coupled to the wand, the wand assembly being configured to vacuum accumulated debris from the screen; and a debris guard covering the front of the screen and including a plurality of guard openings defining a guard opening size that is greater than the screen aperture size.

18 Claims, 3 Drawing Sheets

(56) References Cited

U.S. PATENT DOCUMENTS

2012/0267180 A1* 10/2012 Wang .................... A01D 41/12
                                                    180/68.1
2018/0009305 A1* 1/2018 Nelson ................... B60K 11/04
2019/0353083 A1* 11/2019 Wichers .................... F01P 5/04

* cited by examiner

AGRICULTURAL HARVESTER COOLER BOX WITH DEBRIS GUARD

FIELD OF THE INVENTION

The present invention pertains to agricultural harvesters and, more specifically, to agricultural harvesters that include cooler boxes.

BACKGROUND OF THE INVENTION

The engine of an agricultural harvester such as a combine is often located at the top rear of the combine chassis with a cooler box mounted adjacent the engine. An engine fan draws cooling air into cooler box cores/heat exchangers mounted in the cooler box through a screen that is intended to prevent crop debris from coating and plugging the cooler cores/heat exchangers. The cooler cores are stacked behind the screen in such a way that the upper and lower cores rely on cleaning of the radially outer portions of the screen in order to receive cooling air flow. The middle core is able to use the central or inner region of the screen for air flow.

During harvesting crop residue is expelled from the rear of combine. Tail or side winds can blow this material back over the combine where it is drawn to the cooler box screen by the engine fan and covers the screen. A rotating suction wand, which rotates e.g., at approximately 80 RPM, is connected to a vacuum source and is used to clean the cooler box screen of crop debris. However, there is still a risk of debris accumulating on the screen and detrimentally affecting cooling performance.

What is needed in the art is a cooler box for an agricultural harvester that is less prone to debris accumulation than known cooler boxes.

SUMMARY OF THE INVENTION

Exemplary embodiments disclosed herein provide a cooler box with a screen and a debris guard covering a front of the screen that has guard openings sized to prevent relatively large debris from accumulating on the screen.

In some exemplary embodiments provided in accordance with the present disclosure, a cooler box for an agricultural harvester includes: a frame including an opening; a screen held in the opening and including a plurality of screen apertures defining a screen aperture size; a cooling fan configured to produce an airstream that flows through a front of the screen; a wand assembly including a wand associated with the screen and a blower coupled to the wand, the wand assembly being configured to vacuum accumulated debris from the screen; and a debris guard covering the front of the screen and including a plurality of guard openings defining a guard opening size that is greater than the screen aperture size.

In some exemplary embodiments provided in accordance with the present disclosure, an agricultural harvester includes a chassis, an engine carried by the chassis, and a cooler box associated with the engine. The cooler box includes: a frame including an opening; a screen held in the opening and including a plurality of screen apertures defining a screen aperture size; a cooling fan configured to produce an airstream that flows through a front of the screen; a wand assembly including a wand associated with the screen and a blower coupled to the wand, the wand assembly being configured to vacuum accumulated debris from the screen; and a debris guard covering the front of the screen and including a plurality of guard openings defining a guard opening size that is greater than the screen aperture size.

One possible advantage that may be realized by exemplary embodiments provided in accordance with the present invention is that the debris guard may prevent relatively large debris, such as corn leaves, from accumulating on the screen and interfering with operation of the wand.

Another possible advantage that may be realized by exemplary embodiments provided in accordance with the present invention is that the debris guard may be configured, as well as spaced from the screen, so the debris guard does not significantly interfere with airflow across the screen and cooling performance of the cooler box.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
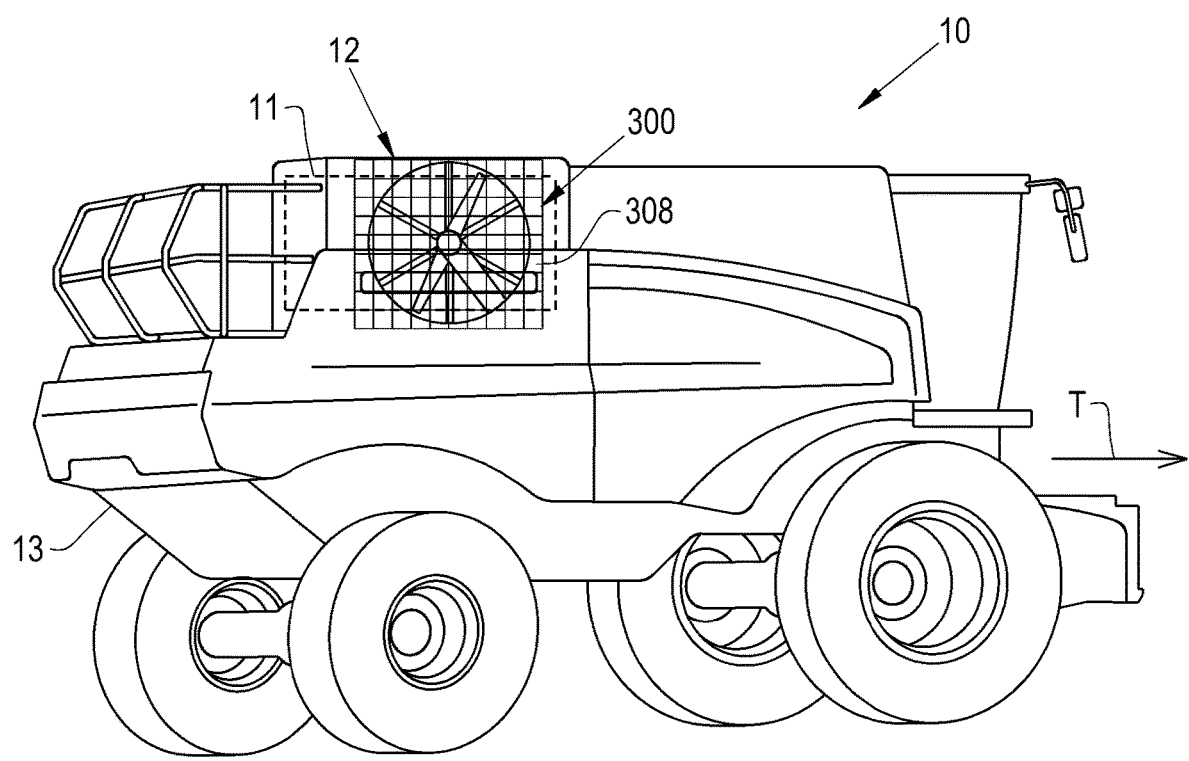
FIG. 1 illustrates a perspective view of an exemplary embodiment of an agricultural harvester, the agricultural harvester comprising an engine and a cooler box associated with the engine, in accordance with an exemplary embodiment of the present disclosure.

Referring now to the drawings, and more particularly to FIG. 1, an exemplary embodiment of an agricultural harvester 10, such as a combine, formed in accordance with the present disclosure is illustrated. Located at the upper rear of the combine is an engine 11 carried by a chassis 13 of the combine 10. A cooler box 12 is associated with the engine 11 for cooling the engine 11 and other components of the harvester 10. In some embodiments, the chassis 13 defines a travel direction T of the combine 10 and the cooler box 12 is disposed laterally to the engine 11, relative to the travel direction T, as illustrated.

Figure 2:
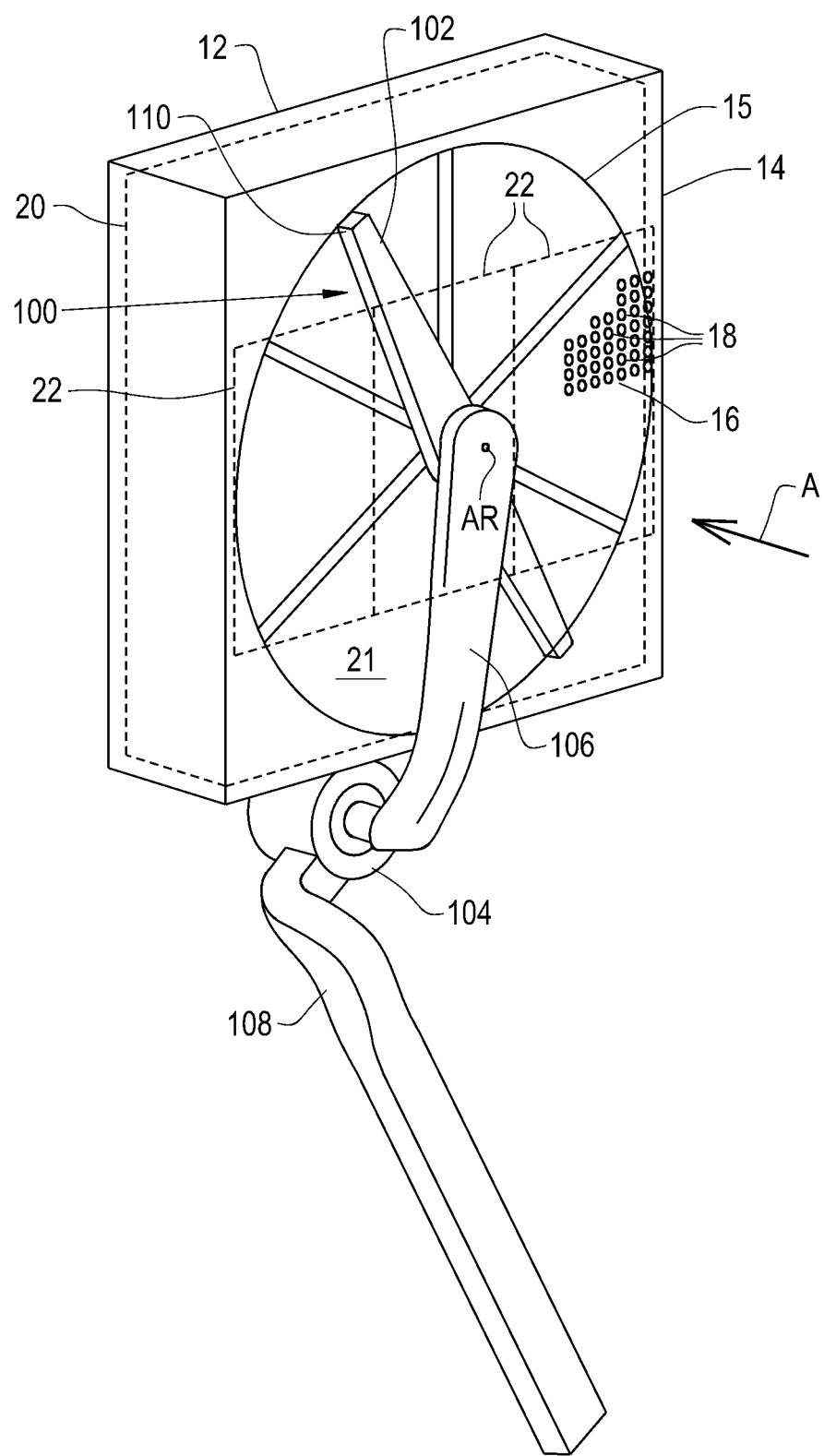
FIG. 2 illustrates a portion of the cooler box of FIG. 1, in accordance with an exemplary embodiment of the present disclosure.

Referring specifically now to FIG. 2, the cooler box 12 includes a frame 14 having an opening 15 and a circular screen 16 held in the opening 15. The screen 16 has a plurality of screen apertures 18, with each of the apertures 18 defining a respective screen aperture size. In some embodiments, all of the apertures 18 define the same screen aperture size. A fan 20, illustrated behind the screen 16, is configured to produce an airstream, denoted by arrow A, that passes through a front 21 of the screen 16 for communication with the internals of the cooler box 12. The frame 14 of the cooler box 12 may hold, among other things, one or more cooling cores 22 forming a radiator of the combine 10.

A wand assembly 100 is provided and includes a wand 102 associated with the screen 16 and a blower 104 coupled to the wand 102. The wand 102 may include, for example, a longitudinal rear face facingly engaging the screen 16, which may be fixedly held in the opening 15. In some embodiments, the wand 102 is mounted adjacent the screen 16 so as to rotate about an axis of rotation AR such that rotation of the tips of the wand 102 forms a circle substantially matching the size of the circular screen 16 or slightly overlaying the circular screen. A suction hose 106 operatively connects the wand 102 to the blower 104, which may be a fan, and thereafter a discharge 108, as is known.

During operation, the wand 102 may rotate about the axis of rotation AR. The wand 102 has a channel 110 formed therein that faces the screen 16. The blower 104 produces a negative pressure in the wand 102, and the channel 110, so the wand assembly 100 vacuums accumulated debris from the screen 16. In some embodiments, the wand 102 continuously rotates about the axis of rotation AR to continuously remove debris from different areas of the screen 16. It should be appreciated that, alternatively, the screen 16, rather than the wand 102, may rotate so debris is removed from the screen 16 by the wand 102.

It has been discovered that, in certain instances, the wand assembly 100 is not effective to remove debris from the screen 16. For example, in dry, windy conditions, relatively large debris items, such as corn leaves, tend to be blown around the combine 10 in proximity to the cooler box 12, which may be placed near a lateral edge of the combine 10. These debris items, which are relatively light, can become entrained by the airstream A that is produced to flow over and cool the cooling cores 22. The entrained debris items can then become trapped on the screen 16 and bunch up. The bunched up debris items can interfere with rotation of the wand 102, preventing the wand 102 from rotating and clearing debris from the screen 16. As a result, debris can accumulate on the screen 16 and prevent sufficient airflow being produced across the cooling cores 22, leading to warning alarms and possible overheating. A user must then manually clean accumulated debris from the screen 16 so components of the combine 10 do not overheat, which is inconvenient and results in lost harvesting time.

Figure 3:
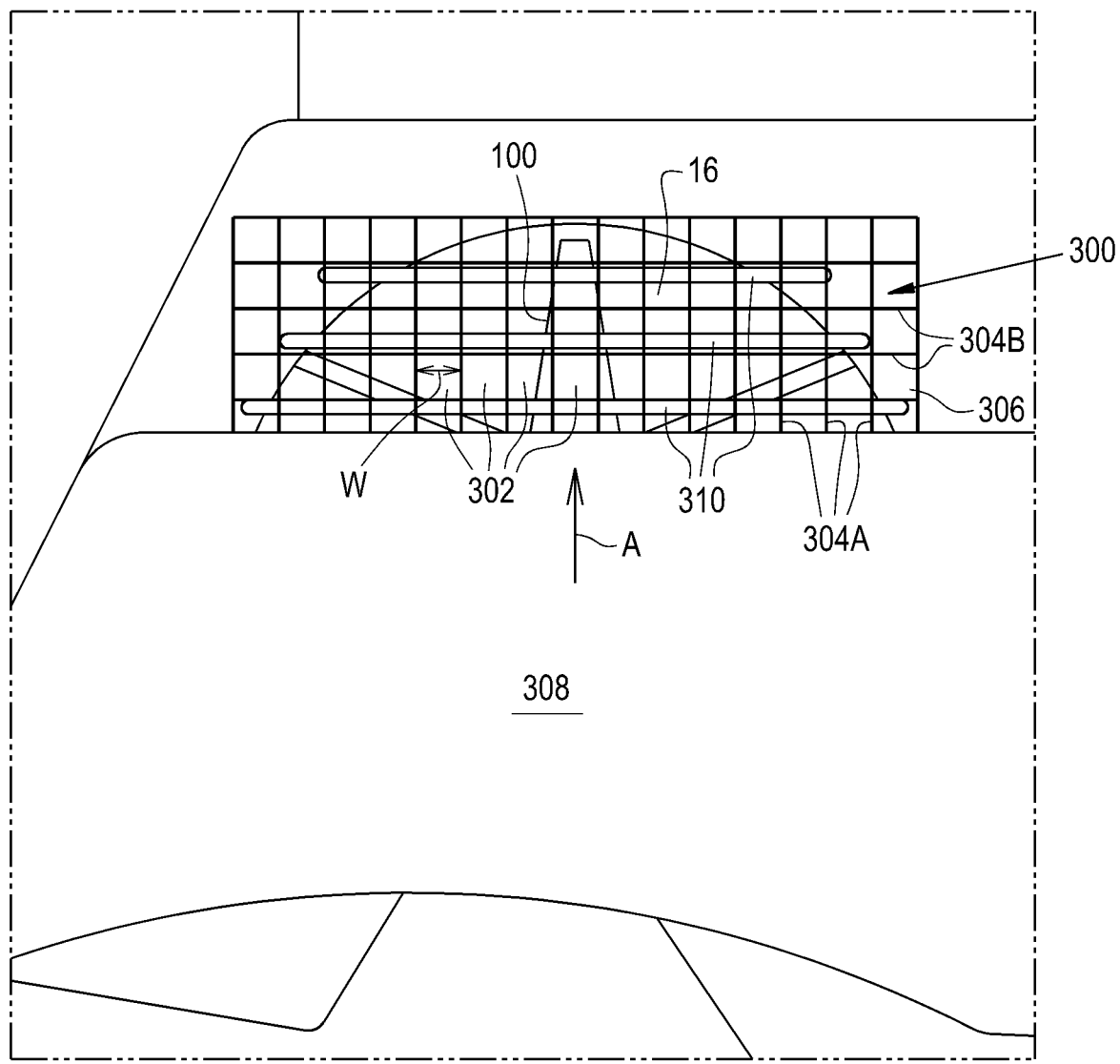
FIG. 3 illustrates a side view of the agricultural harvester of FIG. 1, in accordance with an exemplary embodiment of the present invention.

To address some of these discovered issues, and referring now to FIG. 3 as well, an exemplary embodiment of a debris guard 300 is provided. The debris guard 300 covers the front 21 of the screen 16 and includes a plurality of guard openings 302 defining a guard opening size that is greater than the screen aperture size of the screen apertures 18. In some embodiments, the guard opening size is the same for each of the guard openings 302. The debris guard 300 may include a plurality of connected wires 304A, 304B defining the guard openings 302 therebetween. The connected wires 304A, 304B may include, for example, first wires 304A that all extend in parallel to each other and second wires 304B that all extend in parallel to each other but transversely, such as orthogonally, to the first wires 304A. In some embodiments, the debris guard 300 is placed behind a trim piece 308.

The guard opening size of the guard openings 302 can be varied to prevent relatively large particles from reaching the screen 16. For example, the debris guard 300 can be configured to prevent corn leaves, which are relatively large and can jam the wand 102, from reaching the screen 16. To trap corn leaves and other relatively large debris, the guard opening size of the guard openings 302 may be no greater than 25 mm in width W or length L. At these sizes, the debris guard 300 can be effective to trap corn leaves and other large debris items that may be encountered without significantly reducing the amount of air that flows through the cooler box 12.

In some embodiments, the debris guard 300 is spaced from the screen 16 so the airstream A is not significantly affected by debris that accumulates on the debris guard 300 and the airstream A does not tend to pull the accumulated debris onto the debris guard 300. For example, the screen 16 and the debris guard 300 may define a separation distance therebetween that is between 15 centimeters and 35 centimeters. At such separation distances, the airstream A has little, if any, effect on the accumulated debris, and vice versa, so the accumulated debris is allowed to fall off the debris guard 300 due to gravity and the accumulated debris does not significantly affect the airstream A. It should be appreciated that these separation distances are exemplary only, and different spacings between the screen 16 and the debris guard 300 may be chosen for a similar effect. In some embodiments, the debris guard 300 is placed near an edge of the combine 10 so accumulated debris falls onto the ground due to gravity and does not pose a clogging or jamming threat to other components of the combine 10. The fan 20 may be, for example, an engine fan with a rotation speed that drops when the engine speed of the engine 11 drops so only a weak airstream A is produced when the combine 10 is stopped, which promotes accumulated debris falling off the debris guard 300.

The debris guard 300 includes a front face 306, with the guard openings 302 being formed through the front face 306. In some embodiments, the guard openings 302 occupy at least 90% of a surface area of the front face 306 so the front face 306 is mostly occupied by the guard openings 302. The guard openings 302 occupying such a large amount of the front face 306 allows sufficient airflow to flow through the debris guard 300 for cooling components of the combine 10. The amount of surface area occupied by the guard openings 302 may be adjusted by, for example, changing a width, number, and/or spacing of the wires 304A, 304B.

The cooler box 12 may also include one or more brush guards 310 disposed between the screen 16 and the debris guard 300. The brush guards 310 may be formed as, for example, relatively long bars that extend in parallel in front of the screen 16. The brush guards 310 may be sized and spaced from each other to prevent, for example, tree limbs and other similar objects from damaging the screen 16 and the wand assembly 100 as the harvester 10 travels through a field.

From the foregoing, it should be appreciated that the debris guard 300 provided in accordance with the present disclosure can reduce the risk of large debris items, such as corn leaves or other debris, accumulating on the screen 16 and, for example, jamming rotation of the wand 102. Whereas the screen 16 can trap relatively fine debris, such as dust, the debris guard 300 can trap large debris items that are more difficult for the wand assembly 100 to clean from the screen 16. Thus, the debris guard 300 can reduce the incidence of overheating warnings or events that require operation stoppage of the combine 10. Further, the debris guard 300 can be configured and spaced from the screen 16 such that the debris guard 300 does not significantly interfere with airflow through the cooler box 12 or cooling performance. The debris that accumulates on the debris guard 300 can also fall off the debris guard 300 due to gravity, so the debris guard 300 is self-cleaning. Therefore, the debris guard 300 provided in accordance with the present disclosure can reduce the risk of overheating warnings and events of the combine 10 without significantly reducing the cooling performance of the cooler box 12 or requiring a user to regularly clean the debris guard 300.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A cooler box for an agricultural harvester, comprising:
   a frame comprising an opening;
   a screen held in the opening and comprising a plurality of screen apertures defining a screen aperture size;
   a cooling fan configured to produce an airstream that flows through a front of the screen;
   a wand assembly comprising a wand associated with the screen and a blower coupled to the wand, the wand assembly being configured to vacuum accumulated debris from the screen; and
   a debris guard covering the front of the screen and comprising a plurality of guard openings defining a guard opening size that is greater than the screen aperture size,
   wherein the debris guard comprises a plurality of connected wires defining the plurality of guard openings therebetween.

2. The cooler box of claim 1, wherein the wand is rotatable with respect to the screen.

3. The cooler box of claim 2, wherein the screen is fixedly held in the opening.

4. The cooler box of claim 1, wherein the debris guard is configured to prevent corn leaves from reaching the screen.

5. The cooler box of claim 1, wherein the guard opening size is no greater than 25 mm in width or length.

6. The cooler box of claim 5, wherein the screen and the debris guard define a separation distance therebetween that is between 15 and 35 centimeters.

7. The cooler box of claim 1, wherein the debris guard comprises a front face, the plurality of guard openings occupying at least 90% of a surface area of the front face.

8. The cooler box of claim 1, further comprising at least one cooling core held by the frame.

9. An agricultural harvester, comprising:
   a chassis;
   an engine carried by the chassis; and
   a cooler box associated with the engine, the cooler box comprising:
      a frame comprising an opening;
      a screen held in the opening and comprising a plurality of screen apertures defining a screen aperture size;
      a cooling fan configured to produce an airstream that flows through a front of the screen;
      a wand assembly comprising a wand associated with the screen and a blower coupled to the wand, the wand assembly being configured to vacuum accumulated debris from the screen; and
      a debris guard covering the front of the screen and comprising a plurality of guard openings defining a guard opening size that is greater than the screen aperture size,
      wherein the debris guard comprises a plurality of connected wires defining the plurality of guard openings therebetween.

10. The agricultural harvester of claim 9, wherein the wand is rotatable with respect to the screen.

11. The agricultural harvester of claim 10, wherein the screen is fixedly held in the opening.

12. The agricultural harvester of claim 9, wherein the debris guard is configured to prevent corn leaves from reaching the screen.

13. The agricultural harvester of claim 9, wherein the guard opening size is no greater than 25 mm in width or length.

14. The agricultural harvester of claim 13, wherein the screen and the debris guard define a separation distance therebetween that is between 15 and 35 centimeters.

15. The agricultural harvester of claim 9, wherein the debris guard comprises a front face, the plurality of guard openings occupying at least 90% of a surface area of the front face.

16. The agricultural harvester of claim 9, wherein the cooler box comprises at least one cooling core held by the frame.

17. The agricultural harvester of claim 9, wherein the chassis defines a travel direction and the cooler box is disposed laterally to the engine, relative to the travel direction.

18. The agricultural harvester of claim 9, wherein the debris guard is configured to allow accumulated debris to fall onto the ground due to gravity.

\* \* \* \* \*